United States Patent [19]

Hendricks et al.

[11] Patent Number: 4,787,910

[45] Date of Patent: Nov. 29, 1988

[54] CONDENSATION PRODUCTS AND PROCESSES FOR THE AFTER-TREATMENT OF DYED POLYAMIDES

[75] Inventors: Udo Hendricks, Odenthal; Ergun Tamer, Leverkusen, both of Fed. Rep. of Germany

[73] Assignee: Bayer Aktiengesellschaft, Leverkusen, Fed. Rep. of Germany

[21] Appl. No.: 18,105

[22] Filed: Feb. 20, 1987

[30] Foreign Application Priority Data

Mar. 11, 1986 [DE] Fed. Rep. of Germany ....... 3607963

[51] Int. Cl.⁴ ............................................. D06M 15/00
[52] U.S. Cl. .................... 8/115.61; 8/115.56; 8/115.65
[58] Field of Search ............... 528/405, 422; 8/115.56, 8/115.65, 115.61

[56] References Cited

U.S. PATENT DOCUMENTS

| | | | |
|---|---|---|---|
| 2,903,381 | 9/1959 | Schroeder | 8/115.61 |
| 4,588,413 | 5/1986 | Keil et al. | 8/543 |
| 4,592,758 | 6/1986 | Fikentscher et al. | 8/567 |
| 4,599,087 | 7/1986 | Heller et al. | 8/495 |

FOREIGN PATENT DOCUMENTS

| | | |
|---|---|---|
| 0133933 | 3/1985 | European Pat. Off. . |
| 0160879 | 11/1985 | European Pat. Off. . |
| 1520424 | 3/1970 | Fed. Rep. of Germany . |
| 1645017 | 6/1970 | Fed. Rep. of Germany . |
| 3417239 | 11/1985 | Fed. Rep. of Germany . |
| 2557602 | 5/1985 | France . |
| 2006279 | 5/1979 | United Kingdom . |

OTHER PUBLICATIONS

Chemical Abstracts, Band 94, Nr. 16, Apr. 1981, Seite 81, Zusammenfassung Nr. 123043q, Columbus, Ohio, U.S.; & JP-A-80 152 879, (Nitto Boseki Co. Ltd.), 28-1-1-1980.
Chemical Abstracts, 86:74335k.
Chemical Abstracts, 93:151593s.

*Primary Examiner*—Paul Lieberman
*Assistant Examiner*—John F. McNally
*Attorney, Agent, or Firm*—Sprung Horn Kramer & Woods

[57] ABSTRACT

Condensation products of alkylenediamines of the formula $$H_2N-C_nH_{2n}-NH_2 \qquad I,$$

in which
n represents 4–10,
and an epihalogenohydrin or 1,3-dihalogeno-2-hydroxypropane are used for the after-treatment of natural and synthentic fibre materials which are dyed with anionic dyestuffs and contain polyamide groups.

6 Claims, No Drawings

CONDENSATION PRODUCTS AND PROCESSES FOR THE AFTER-TREATMENT OF DYED POLYAMIDES

The invention relates to condensation products of alkylenediamines of the formula $$H_2N\text{---}C_nH_{2n}\text{---}NH_2 \qquad I$$

in which
n represents 4–10,
and an epihalogenohydrin or 1,3-dihalogeno-2-hydroxypropane and processes for the after-treatment, with these condensation products, of natural and synthetic fibre materials which are dyed with an ionic dyestuffs and contain polyamide groups.

The alkylene radical $C_nH_{2n}$ in formula (I) can be straight-chain or branched. Preferred alkylene radicals are the tetramethylene radical and a hexamethylene radical which is optionally substituted by 1–3 methyl groups.

Examples which may be mentioned of alkylenediamines of the formula (I) are: tetramethylenediamine, hexamethylenediamine and 2,2,4- and 2,4,4-trimethylhexamethylenediamine.

Halogen preferably represents chlorine or bromine.

Epichlorohydrin is the preferred epihalogenohydrin and 1,3-dichloro-2-hydroxypropane is the preferred 1,3-dihalogeno-2-hydroxypropane.

The condensation products according to the invention are water-soluble. Condensation products which are obtained by reaction of alkylenediamines (I) and epihalogenohydrin or 1,3-dihalogeno-2-hydroxypropane in a molar ratio of 1:1 to 1:3, in particular in a molar ratio of 1:1.8 to 1:2.2, may be mentioned in particular.

The reaction is carried out, in particular, in a polar solvent, preferably water, at temperatures from 10° C. to 90° C., in particular between 30° C. and 50° C., over a period of 30 minutes to 4 hours. Higher reaction temperatures shorten the reaction time.

In order to prevent a condensation which is too far-reaching and to increase the storage stability of the products, it has proved advantageous to adjust the pH value of the reaction mixtures to values below 7, in particular below 5, towards the end of the reaction time by addition of inorganic or organic acids. Mineral acids, in particular hydrochloric acid, are preferably used to establish the pH value. The aqueous solutions of the neutralized condensation products have viscosities of 30–800 mPa.s at 20° C., preferably more than 200 mPa.s, at a solids content of 35%.

The process according to the invention for after-treatment of fibre materials with the condensation products described above is carried out by methods which are known per se.

The textile materials employed for the after-treatment can be wool, silk or synthetic polyamides, such as polymers of ε-caprolactam and polymers of dicarboxylic acids and diamines, for example of adipic acid and hexamethylenediamine. The textile materials can be in the form of flocks, slivers, yarn or piecegoods. The process is preferably used for after-treatment of dyed wool. This can be non-chlorinated or chlorinated wool or wool provided with an anti-felt finish by a synthetic resin pretreatment; particularly good effects are obtained in the after-treatment of dyeings on chlorinated wool or wool provided with an anti-felt finish by a synthetic resin pretreatment.

The chlorination of the wool can be carried out continuously or discontinuously by customary processes using hypochlorous acid or with chlorine isocyanurate.

The anti-felt finishing can be carried out by various known processes, for example by the HERCOSETT process. These processes, which are also known as superwash finishing, are chlorination processes and processes in which the fibres are treated with a resin, for example a polyurethane, polyacrylic, melamine, polyalkyleneimine/epichlorohydrin or polyamide/epichlorohydrin resin.

Processes of this type are described, for example, by M. Bahra, Zeitschrift für die gesamte Textilindustrie, 1964, No. 6, pages 519–522, G. Meier, textilpraxis international, 1975, volume 1, pages 76–79 and volume 3, pages 304–306 and R. R. D. Holt, Journal of the Society of Dyers and Colourists, 1975, No. 2, pages 38–44.

The condensation products according to the invention are preferably added to the after-treatment baths in the form of aqueous solutions, it being possible for the amounts of the condensation products to vary within wide limits.

In general, it has proved appropriate to add 0.5–6, preferably 1–4% by weight, based on the weight of the fibre materials.

The after-treatment of the textile material is advantageously carried out in a manner such that the dyed material, preferably wool which has already been provided with an anti-felt finish, is introduced into an aqueous liquor which contains the condensation products according to the invention and has a pH value of between 6 and 10. The liquor is preferably brought to a pH value of 8–10 by addition of alkaline compounds, for example ammonia or sodium carbonate.

The temperature of the treatment bath is increased to 50°–80° C. in the course of 20–30 minutes and left at that temperature for 5–30 minutes. The material is then rinsed with cold water, acidified with acetic acid, drained and dried.

As described above, the after-treatment can be carried out by the exhaustion process or continuously or semi-continuously by padding or spraying with the subsequent action of heat.

The effect of the condensation products according to the invention can be increased further from case to case by also using nonionic, cationic or amphoteric surface-active substances. Examples of such substances are ethylene oxide and/or propylene oxide adducts of fatty amines, which can be quaternized and/or sulphated. They are known to the expert as levelling auxiliaries for wool dyestuffs.

The amount of such products used is 50–100%, preferably 70–80%, of the amount of the condensation products according to the invention.

The fastness properties, in particular the wet fastness properties, such as the fastness to perspiration in accordance with IWS-TM 174 (test method for fastness to alkaline perspiration) and the fastness to washing in accordance with IWS-TM 193 (test method for fastness to washing) are considerably improved with the aid of the process according to the invention.

Possible dyestuffs are the dyestuffs usually employed for dyeing fibres containing polyamide groups, for example acid dyestuffs, metal complex dyestuffs, such as 1:1 metal complex dyestuffs, which can contain groups which render them water-soluble, such as sulphonic acid or carboxylic acid groups or sulphonamide or alkylsulphone radicals, and reactive dyestuffs. They are described in more detail in the Colour Index. Such dyestuffs, which otherwise have good fastness properties, give less fast dyeings in keratin-containing materials provided with an anti-felt finish—especially in the case of deep colour shades.

It has been found, surprisingly, that the poorer fastness properties of these dyeings achieve an astonishingly high level of fastness if they are after-treated with the condensation products according to the invention, without the fastness of the dyeings to rubbing thereby being adversely influenced.

The parts mentioned in the examples and preparation instructions are parts by weight, unless indicated otherwise. The amounts of dyestuff mentioned are based on the information in the Colour Index, 3rd edition, volume 5 (1971).

PREPARATION EXAMPLE 1

58 parts of hexamethylenediamine were dissolved in 60 parts of water and 92.5 parts of epichlorohydrin were added dropwise at 20°–25° C. in the course of 1 hour.

After the mixture had been stirred at 33°–35° for 3 hours, it was warmed to 43°–45° and stirred at the same temperature for 1 hour. The mixture, the viscosity of which had increased greatly, was diluted with 100 parts of water and stirred at 43°–45° C. for 50 minutes. It was then diluted with a further 100 parts of water and brought to a pH value of 4–4.5 with 32 parts of concentrated hydrochloric acid. A clear yellowish solution with a solids content of 37% and a viscosity of 655 mPa.s at 20° was obtained.

PREPARATION EXAMPLE 2

58 parts of hexamethylenediamine were dissolved in 60 parts of water and 69 parts of epichlorohydrin were added at 20°–30° in the course of 1 hour. After the mixture had been stirred at 30°–32° for 3 hours, it was warmed to 40°–42° and stirred at 40°–42° C. for 50 minutes. After addition of 100 ml of water, the pH value was brought to 4–4.5 with 52 g of concentrated hydrochloric acid.

A clear solution with a solids content of 43.8% and a viscosity of 97 mPa.s at 20° was obtained.

PREPARATION EXAMPLE 3

79 parts of a mixture of 2,2,4-trimethyl-1,6-hexanediamine were mixed with 70 parts of water and 92.5 parts of epichlorohydrin were added at 40°–45° C. in the course of 45 minutes. After the addition, the mixture was stirred at 50°–55° C. for 3 hours and then diluted with 50 parts of water and stirred at the same temperature for a further 80 minutes. The pH value was then brought to 4–4.5 with 32 parts of concentrated hydrochloric acid. A clear viscous solution with a solids content of 57% was obtained.

A viscosity of 32 mPa.s at 20° C. was measured in a 35% strength solution.

USE EXAMPLE 1

Woollen yarn which has been finished with HERCOSETT 57 "Superwash" (chlorination and treatment with an adipic acid/diethylenetriamine epichlorohydrin reaction product) is treated in a liquor ratio of 1:20 at room temperature for 15 minutes with a dye liquor containing, per liter, 1.0 g of the dyestuff C.I. Acid Blue 49 (=No. 62 095), 2.0 g of calcined sodium sulphate, 1.5 g of acetic acid (60%) and 0.5 g of the levelling auxiliary of the following formula

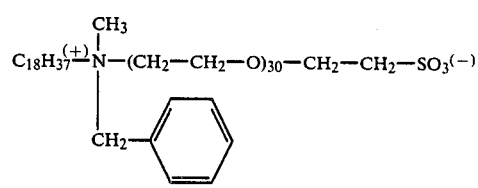

The dyebath is heated to the boiling point in the course of 60 minutes and dyeing is carried out at this temperature for 60 minutes. The wool is then rinsed.

After-treatment is carried out in the following manner: the resulting wool is treated in a liquor ratio of 1:20 for 5 minutes at room temperature with an aqueous liquor containing, per liter, 2.0 g of the reaction product according to Preparation Example 1. The bath is then heated to 50° C. in the course of 15 minutes and left at this temperature for 5 minutes, the pH is brought to 9.0–9.5 by addition of sodium carbonate and treatment is continued at 50° C. for 25 minutes. The wool is then rinsed, acidified with acetic acid, drained and dried.

The fastness tests which are carried out on this after-treated dyeing show that the level of fastness is considerably improved by the after-treatment, so that the IWS specifications (IWS-TM 193 and IWS-TM 174) are reached without problems; this is effected without deterioration in the fastness to rubbing.

A very good level of fastness is also obtained if the dyestuff Acid Blue 335 is used instead of C.I. Acid Blue 49.

USE EXAMPLE 2

The procedure is as described in Example 1, with the difference that the after-treatment is carried out with a liquor containing 1.6 g of the reaction product according to Preparation Example 2 per liter.

A substantial improvement in the fastness properties of the dyeing is obtained in this manner; this is effected without deterioration in the fastness to rubbing.

USE EXAMPLE 3

Wool slivers which have been finished with HERCOSETT 57 are introduced in a liquor ratio of 1:10 at room temperature into a dye bath containing, per liter, 1 g of the dyestuff C.I. Acid Red 296 (=No. 15 675), 1 g of calcined sodium sulphate, 2.5 g of acetic acid (60° C.) and 0.6 g of the levelling auxiliary used in Example 1. The dye liquor is then heated to the boiling point in the course of 60 minutes and kept at this temperature for 60 minutes. After rinsing, the wool is after-treated as described in Example 1.

The dyeing has a considerably improved level of fastness; this is effected without deterioration in the fastness to rubbing.

USE EXAMPLE 4

Woollen yarn provided with an anti-felt finish and wound on bobbins is dyed in a liquor ratio of 1:15 as described in Example 1, but using a dye liquor which contains, per liter, 1.6 g of the dyestuff C.I. Acid Green 50 (=C.I. 44 090), 0.75 g of calcined sodium sulphate, 2.0 g of acetic acid (60% strength) and 0.5 g of the reaction product of 1 mol of N-methylstearylamine and 30 mol of ethylene oxide.

The after-treatment is carried out as described in Example 1. The dyeing bath obtained in this manner has very good fastness properties; this is effected without deterioration in the fastness to rubbing.

USE EXAMPLE 5

Strands of woollen yarn finished with HERCOSETT 57 are introduced at room temperature in a liquor ratio of 1:25 into a dye liquor which contains, per liter, 1.2 g of the red dyestuff of French Patent Specification No. 1,389,345, Example 1, 1.0 g of calcined sodium sulphate, 2.0 g of acetic acid (60% strength) and 0.4 g of an auxiliary mixture consisting of 50 parts of the reaction product of 1 mol of N-methyl-stearylamine and 20 mol of ethylene oxide and 50 parts of the reaction product of 1 mol of N-methyl-stearylamine and 35 mol of ethylene oxide.

The procedure both during dyeing and during after-treatment is as described in Example 1, but with the difference that the after-treatment is carried out with 1.0 g of the reaction product according to Preparation Example 3.

In this case also, a considerable improvement in the fastness properties of the dyeing is achieved; this is effected without deterioration in the fastness to rubbing.

USE EXAMPLE 6

Wool slivers which have first been prechlorinated in the customary manner are dyed in a liquor ratio of 1:10 as described in Example 1 and, after rinsing, are after-treated at 50° C. for 5 minutes in a liquor containing 4.0 g of the reaction product according to Preparation Example 1. The pH value of the treatment bath is then brought to about 10 by addition of sodium carbonate. The dyeing is treated at 50° C. for a further 25 minutes.

Finally, the slivers are rinsed, acidified with acetic acid, drained and dried.

The fastness tests carried out on this after-treated dyeing show that the fastness level has been considerably improved by the after-treatment, so that the IWS specifications (IWS-TM 193 and IWS-TM 174) are achieved without problems; this is effected without a deterioration in the fastness to rubbing.

What is claimed is:

1. Process for the after-treatment of fiber materials dyed with anionic dyestuffs and containing polyamide groups, wherein the dyed fiber materials are treated with an aqueous solution of a condensation product of an alkylenediamine of the formula $$H_2N\text{—}C_nH_{2n}\text{—}NH_2$$

in which
n represents 4–10, with an epihalogenohydrin or 1,3-dihalogeno-2-hydroxypropane.

2. Process according to claim 1, wherein the dyed fiber materials consist of chlorinated wool or wool provided with an anti-felt finish.

3. Process according to claim 2, wherein the after-treatment is carried out by the exhaustion or padding process.

4. Process according to claim 1, wherein the molar ratio of alkylenediamine and epihalogenohydrin or 1,3-dihalogeno-2-hydroxypropane is 1:1 to 1:3.

5. Process according to claim 1, wherein the alkylenediamine is tetramethylenediamine or hexamethylenediamine which is optionally substituted by 1–3 methyl groups.

6. Process according to claim 1, wherein the epihalogenohydrin is epichlorohydrin and the 1,3-dihalogeno-2-hydroxypropane is 1,3-dichloro-2-hydroxypropane.

* * * * *